United States Patent
Miyamura et al.

(10) Patent No.: US 11,175,843 B2
(45) Date of Patent: Nov. 16, 2021

(54) DATA STORAGE SYSTEM WITH GENERATION ROLLBACK CONTROL

(71) Applicant: International Business Machines Corporation, Armonk, NY (US)

(72) Inventors: Tsuyoshi Miyamura, Yokohama (JP); Tohru Hasegawa, Tokyo (JP); Hiroshi Itagaki, Yokohama (JP); Noriko Yamamoto, Tokyo (JP); Shinsuke Mitsuma, Machida (JP)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 16/197,475

(22) Filed: Nov. 21, 2018

(65) Prior Publication Data

US 2020/0159433 A1 May 21, 2020

(51) Int. Cl.
*G06F 16/00* (2019.01)
*G06F 3/06* (2006.01)
*G06F 16/901* (2019.01)

(52) U.S. Cl.
CPC .......... *G06F 3/0643* (2013.01); *G06F 3/0613* (2013.01); *G06F 3/0619* (2013.01); *G06F 3/0682* (2013.01); *G06F 16/901* (2019.01)

(58) Field of Classification Search
CPC .. G06F 16/1727; G06F 16/901; G06F 3/0613; G06F 3/0619; G06F 3/0643; G06F 3/0682

See application file for complete search history.

(56) References Cited

U.S. PATENT DOCUMENTS

| | | | |
|---|---|---|---|
| 10,453,485 B1 | 10/2019 | Miyamura | |
| 10,705,920 B1 * | 7/2020 | Holenstein | G06F 11/1469 |
| 2011/0238716 A1 | 9/2011 | Amir et al. | |
| 2013/0117239 A1 * | 5/2013 | Hasegawa | G06F 16/13 707/687 |
| 2013/0205082 A1 * | 8/2013 | Murayama | G06F 12/0866 711/111 |
| 2016/0063007 A1 * | 3/2016 | Iwasaki | G06F 16/2228 707/645 |
| 2016/0170681 A1 | 6/2016 | Hasegawa | |
| 2018/0067667 A1 | 3/2018 | Miyamura | |

* cited by examiner

*Primary Examiner* — Dinku W Gebresenbet
(74) *Attorney, Agent, or Firm* — William H. Hartwell; Edward J. Wixted, III

(57) ABSTRACT

A linear tape file system (LTFS) maintains a series of indexes, and an incremental change dataset, that records incremental changes that have taken place in each new index over the previous one, as each new index of the series is created. Upon receiving a command to roll back the file system from a current generation to a target previous generation, a generation control module applies information in the incremental change dataset to the current index. In this way, the current index is restored, at least functionally, to the state it was in when the target generation was created, thereby effectuating the rollback of the file system to the target generation.

20 Claims, 12 Drawing Sheets

```
<?xml version="1.0" encoding="UTF-8"?>
<ltfsindex version="2.2.0">
    <generationnumber>3</generationnumber>
    <location>
        <startblock>6</startblock>
    </location>
    <previousgenerationlocation>
        <partition>b</partition>
        <startblock>20</startblock>
    </previousgenerationlocation>
    <highestfileuid>4</highestfileuid>
    <directory>
        <fileuid>1</fileuid>
        <name>LTFS</name>
        <contents>
            <directory>
                <fileuid>2</fileuid>
                <name>directory1</name>
                <contents>
                    <directory>
                        <fileuid>3</fileuid>
                        <name>subdir1</name>
                    </directory>
                </contents>
            </directory>
            <file>
                <fileuid>4</fileuid>
                <name>testfile.txt</name>
            </file>
        </contents>
    </directory>
</ltfsindex>
```

Fig. 4A

```
<?xml version="1.0" encoding="UTF-8"?>
<ltfsindex version="2.2.0">
  . <generationnumber>4</generationnumber>      ~410B
  . <location>
  .   <startblock>6</startblock>
  . </location>
  . <previousgenerationlocation>
  .   <partition>b</partition>                  ~404B
  .   <startblock>23</startblock>               ~412B
  . </previousgenerationlocation>
  . <highestfileuid>5</highestfileuid>          ~414B
  . <directory>
  .   <fileuid>1</fileuid>   ~418B
  .   <name>LTFS</name>
  .   <contents>                                ~426B
  .     <directory>
  .       <fileuid>2</fileuid>
  .       <name>directory1</name>
  .       <contents>
  .         <directory>
  .           <fileuid>3</fileuid>
  .           <name>subdir1</name>
  .         </directory>
  .         <file>                          ⎫
  .           <fileuid>5</fileuid>          ⎬ ~416
  .           <name>fileA.txt</name>        ⎪
  .         </file>                         ⎭
  .       </contents>
  .     </directory>
  .     <file>                              ⎫
  .       <fileuid>4</fileuid>              ⎬ ~424B
  .       <name>testfile.txt</name>         ⎪
  .     </file>                             ⎭
  .   </contents>
  . </directory>
</ltfsindex>
</xml>
```

```
410B     <generationnumber>4</generationnumber>
418B     <directory>
          <fileuid>1</fileuid>
426B      <contents>
           <file>
            <fileuid>4</fileuid>
424B        <name>testfile.txt</name>
           </file>
          </contents>
         </directory>
```

Fig. 4C

```
500B
501B
<generationnumber>3</generationnumber>
<file>
. <fileuid>5</fileuid>
. <name>file.bin</name>
. <extentinfo>
. . <extent>
. . . <partition>b</partition>
. . . <startblock>8</startblock>           ⎫
. . . <byteoffset>0</byteoffset>            ⎬ 507
. . . <bytecount>720000</bytecount>         ⎪
. . . <fileoffset>0</fileoffset>           ⎭
. . </extent>
. . <extent>
. . . <partition>b</partition>
. . . <startblock>18</startblock>          ⎫
. . . <byteoffset>0</byteoffset>            ⎬ 508
. . . <bytecount>600000</bytecount>         ⎪
. . . <fileoffset>720000</fileoffset>      ⎭
. . </extent>
. . <extent>
. . . <partition>b</partition>
. . . <startblock>9</startblock>           ⎫
. . . <byteoffset>271424</byteoffset>       ⎬ 509
. . . <bytecount>9165760</bytecount>        ⎪
. . . <fileoffset>1375000</fileoffset>     ⎭
. . </extent>
. </extentinfo>
</file>
```

510 —
```
<fileuid>5</fileuid>
<extentinfo>
  <extent>
    . <partition>b</partition>
    . <startblock>8</startblock>
    . <byteoffset>0</byteoffset>
    . <bytecount>30000000</bytecount>
    . <fileoffset>0</fileoffset>
  </extent>
</extentinfo>
```
505C

```
<?xml version="1.0" encoding="UTF-8"?>
<ltfsindex version="2.3.0">
    <generationnumber>3</generationnumber>    ← 601A
    <highestfileuid>8</highestfileuid>
    <directory>
        <fileuid>1</fileuid>
        <name>LTFS Volume Name</name>
        <contents>
            <directory>                       ← 606A
                <fileuid>2</fileuid>
                <name>directory1</name>
            </directory>
        </contents>
    </directory>
</ltfsindex>
</xml>
```

604A (brace around directory block)

```xml
<?xml version="1.0" encoding="UTF-8"?>
<ltfsindex version="2.3.0">
  <generationnumber>4</generationnumber>
  <highestfileuid>8</highestfileuid>
  <directory>
    <fileuid>1</fileuid>
    <name>LTFS Volume Name</name>
    <contents>
      <directory>
        <fileuid>2</fileuid>
        <name>directory1</name>
        <extendedattributes>
          <xattr>
            <key>binary_xattr</key>
            <value type="base64">
            yDaaBPBdIUqMhg==</value>
            LTFS Format Specification
            66 SNIA Technical Position LTFS Format
            Specification V2.3.0
          </xattr>
          <xattr>
            <key>empty_xattr</key>
            <value/>
          </xattr>
        </extendedattributes>
      </directory>
    </contents>
  </directory>
</ltfsindex>
</xml>
```

Fig. 6B

```
... <generationnumber>3</generationnumber>
    <fileuid>2</fileuid>
    <extendedattributes></extendedattributes>
```

Fig. 6C

```
<?xml version="1.0" encoding="UTF-8"?>
 <ltfsindex version="2.3.0">
  <generationnumber>3</generationnumber>
  <highestfileuid>8</highestfileuid>
  <directory>
   <fileuid>1</fileuid>
   <name>LTFS Volume Name</name>
   <contents>
    <directory>
     <fileuid>2</fileuid>
     <name>directory1</name>
     <extendedattributes></extendedattributes>
    </directory>
   </contents>
  </directory>
 </ltfsindex>
</xml>
```

Fig. 6D

DATA STORAGE SYSTEM WITH GENERATION ROLLBACK CONTROL

BACKGROUND

The present invention relates generally to the field of computer data storage, and more particularly to non-random access storage systems, such as a Linear Tape File System (LTFS).

A LTFS is a sequential storage file system that provides a file system interface to data that is stored on a magnetic tape storage medium. The data can be written and read in a manner similar, for instance, to the way data is stored on disks, and removable flash drives. Data, in a system that complies with an LTFS standard, is written and accessed in linear fashion on a tape surface along the tape length, on a plurality of parallel tracks distributed across the tape width. The LTFS specifies a data format and requires corresponding software to provide the file system interface. LTFS is an open specification and is based on a self-describing tape format. The LTFS format prescribes that a tape is divided into two partitions, an index partition and a data partition. Meta-information such as file allocation information is recorded in the index partition, and a data body are recorded in the data partition. An index describes the mapping between files and data extents. A data extent contains file data written as sequential logical blocks. A file includes zero or more data extents plus associated meta-data. In addition, an LTFS continuously updates the current index concurrently with any changes in the file system. LTFS periodically (for example, every five minutes by default) appends a new index, in the data partition. Each successive index reflects the state of the file system at the time the index is written.

A tape drive is an apparatus for reading and writing to and from the storage medium of a tape cartridge. Deleted and modified data on the file system, and file system meta-data, are kept intact on the tape. For instance, data that is "deleted" is made invisible to the file system, yet the data itself remains intact on the tape. In a linear tape file system, a "generation" is an incremental number stored in the meta-data (for example, an index), that serves to identify the meta-data. LTFS lists the generation with a time stamp or other associated information. By referencing the meta-data, the file system can provide a capability that is analogous to a snapshot in a random access type of storage system. That makes it possible to roll back the file system to any previous generation, by specifying a corresponding generation number. A file system roll-back operation may be used, for instance, to recover (that is, to make the data again visible to the file system) some original data that had been modified or deleted, or to determine who had modified, or deleted certain data from the file system.

SUMMARY

According to an aspect of the present invention, there is a method, computer program product and/or system that performs the following operations (not necessarily in the following order): (i) mounting, in a tape drive unit, a tape cartridge comprising a tape storage medium; reading, from the tape storage medium: (a) a first index corresponding to a first file system generation present on the tape storage medium, and (b) an incremental change dataset; (ii) modifying the first index to generate a second index corresponding to a second file system generation present on the tape storage medium; (iii) in conjunction with modifying the first index, modifying the incremental change dataset based, at least in part, upon a difference between the first index and the second index; (iv) receiving a first command to roll back the file system generation from the second file system generation to the first file system generation; and (v) in response to receiving the first command, generating a third index based, at least in part, upon a combination of information in the incremental change dataset and information in the second index, wherein the third index is equivalent, at least in function, to the first index.

BRIEF DESCRIPTION OF THE DRAWINGS

FIG. 4A is a first data structure showing information that is generated by embodiments of the present invention;

FIG. 4B is a second data structure showing information that is generated by embodiments of the present invention;

FIG. 4C is a third data structure showing information that is generated by embodiments of the present invention;

FIG. 5B is a fifth data structure showing information that is generated by embodiments of the present invention;

FIG. 5C is a sixth data structure showing information that is generated by embodiments of the present invention;

FIG. 6A is a seventh data structure showing information that is generated by embodiments of the present invention;

FIG. 6B is a eighth data structure showing information that is generated by embodiments of the present invention;

FIG. 6C is a ninth data structure showing information that is generated by embodiments of the present invention; and FIG. 6D is a tenth data structure showing information that is generated by embodiments of the present invention.

DETAILED DESCRIPTION

Figure 1A:
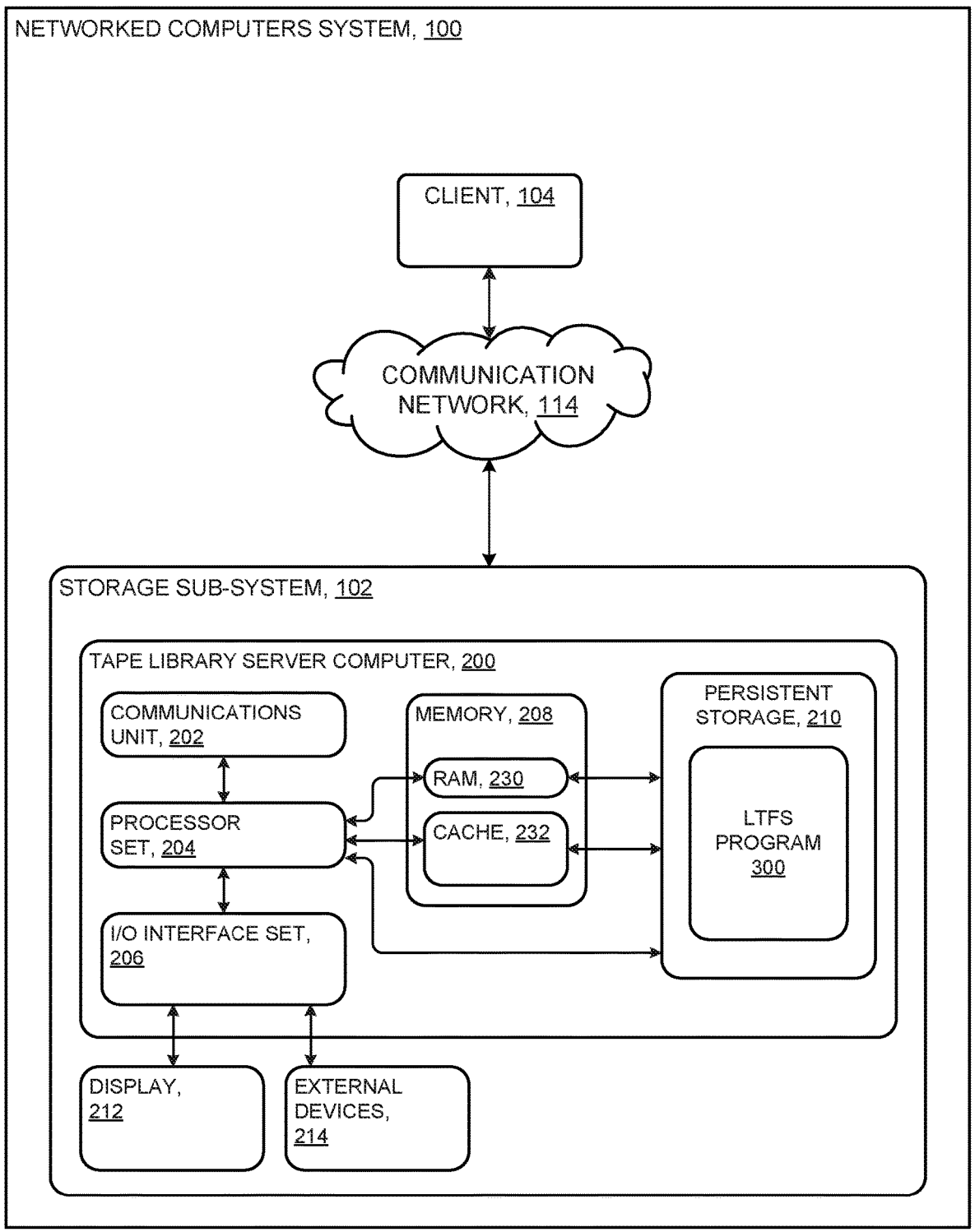
FIG. 1A is a first block diagram of a first embodiment of a system according to the present invention.

In some embodiments of the present invention, a linear tape file system (LTFS) maintains a series of indexes, respectively corresponding to a succession of file system generations. An incremental change module determines what incremental changes have taken place in each new index over the previous one, as each new index of the series is created. The incremental change module saves this "difference information" as an incremental change dataset.

Upon receiving a command to roll back the file system from a current generation to a target previous generation, a generation control module applies information in the incremental change dataset to the current index. In this way, the current index is restored, at least functionally, to the state it was in when the target generation was created, thereby effectuating the rollback of the file system to the target generation.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1A is a functional block diagram illustrating various portions of networked computers system 100, including: storage sub-system 102; client 104; communication network 114; tape library server computer 200; communications unit 202; processor set 204; input/output (I/O) interface set 206; memory device 208;

persistent storage device 210; display device 212; external device set 214; random access memory (RAM) devices 230; cache memory device 232; and linear tape file system (LTFS) program 300.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. LTFS program 300 is a collection of machine readable instructions and/or data that is used to create, manage and control certain software functions that will be discussed in detail, below, in the Example Embodiment sub-section of this Detailed Description section.

Storage sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for storage sub-system 102; and/or (ii) devices external to storage sub-system 102 may be able to provide memory for storage sub-system 102.

LTFS program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

LTFS program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with tape library server computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, LTFS program 300, can be stored on such portable computer-readable storage media. In these embodiments, the relevant software may (or may not) be loaded, in whole or in part, onto persistent storage 210 via I/O interface set 206. I/O interface set 206 also connects in data communication with display 212.

Display 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
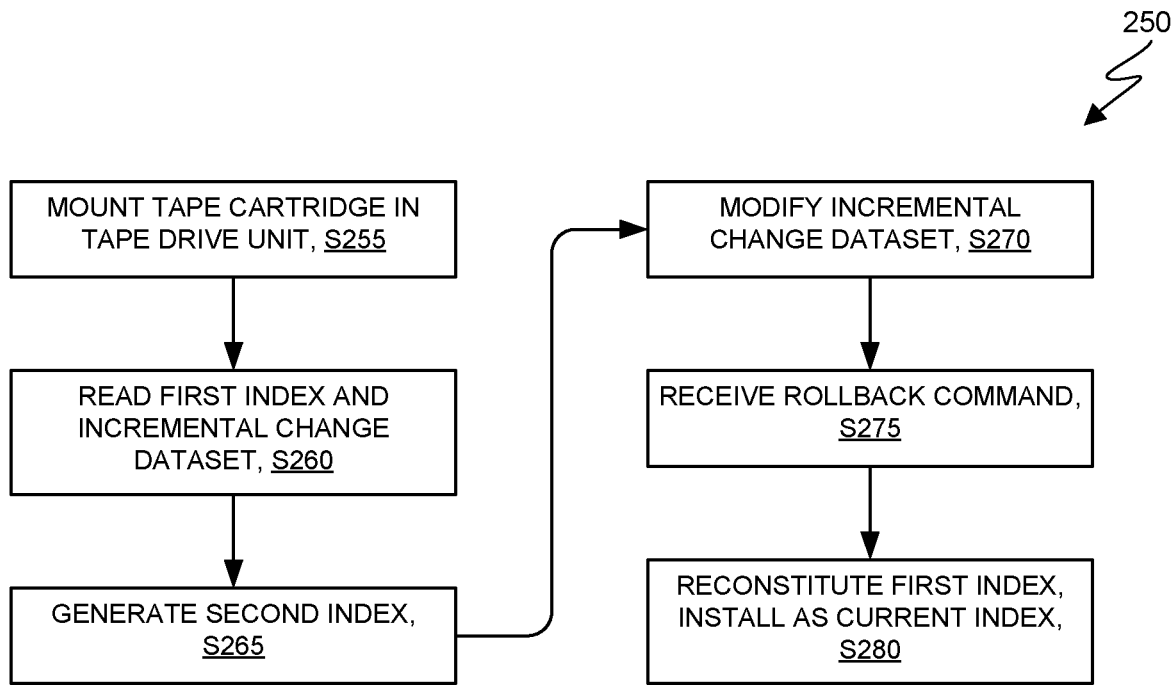
FIG. 2 is a flowchart showing a first embodiment method performed, at least in part, by the first embodiment system.
Figure 3:
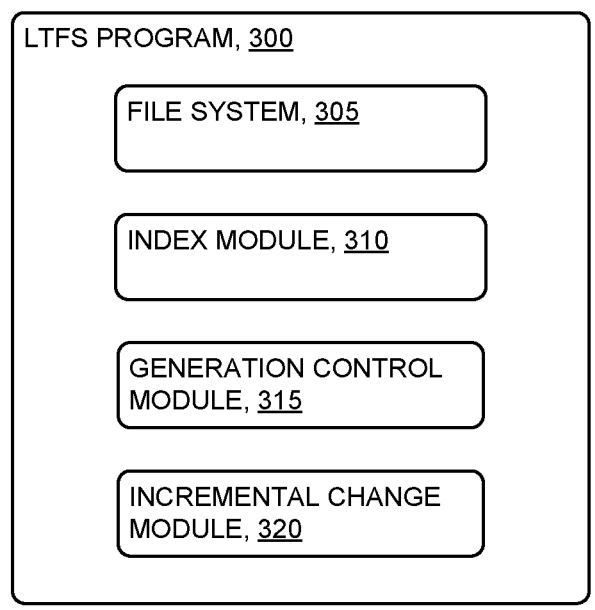
FIG. 3 is a block diagram showing a machine logic (for example, software) portion of the first embodiment system.

FIG. 2 shows flowchart 250 depicting a method according to the present invention. FIG. 3 shows LTFS program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Figure 1B:
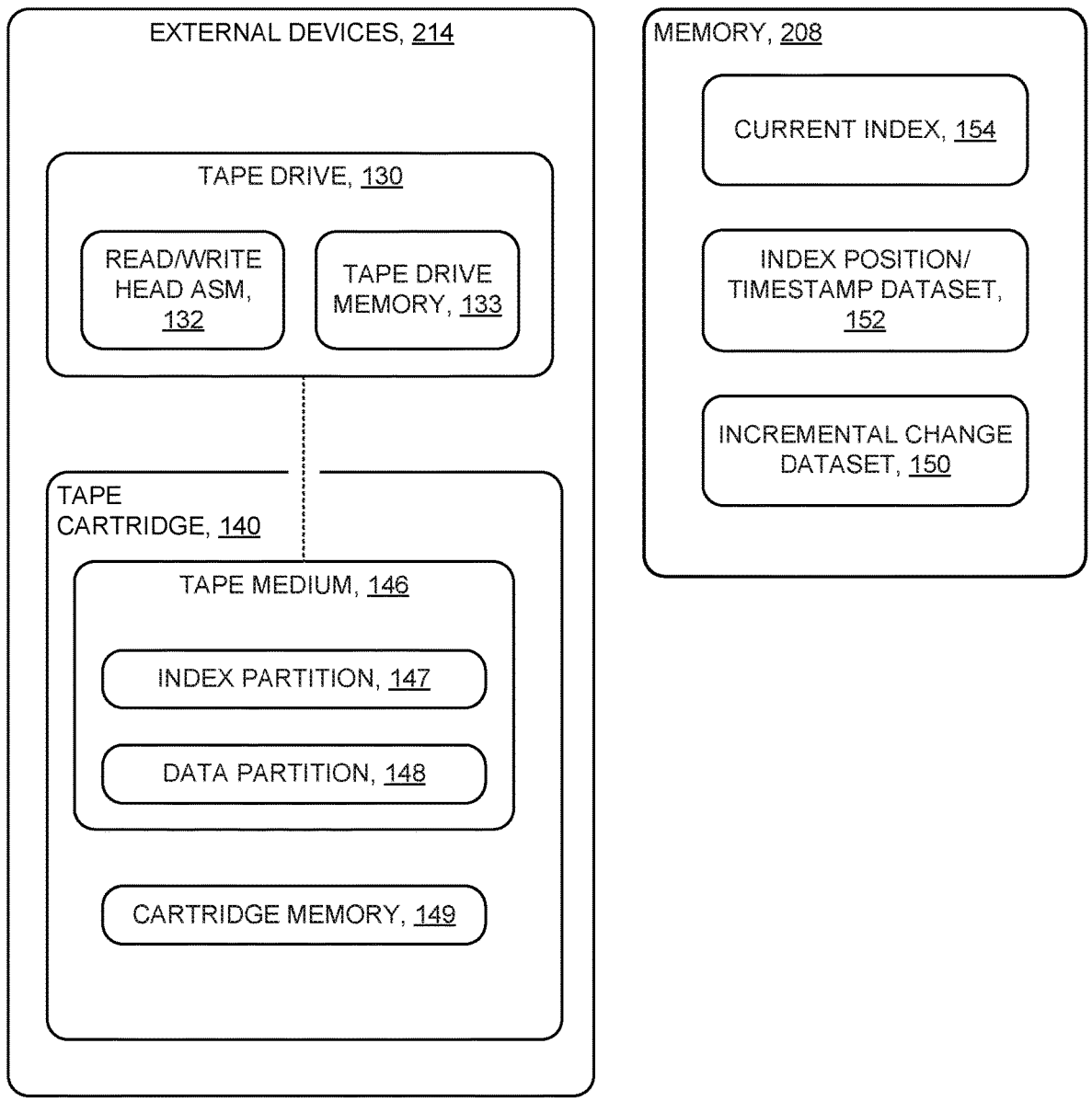
FIG. 1B is a second block diagram of a first embodiment of a system according to the present invention.

Processing begins at operation S255, where tape drive 130 receives tape cartridge 140 and performs mounting operations to bring the tape cartridge up to operational status. Here, operational status means tape drive 130 can perform transport, seek, read, write, etc. operations with respect to tape medium 146 (FIG. 1B).

Current index 154 describes the mapping between files and data extents. In some embodiments of the present invention, index module 310, of LTFS program 300, continuously updates current index 154 as changes in file system 305 (for example, file and/or directory adds, deletes, updates, etc.) take place. Index module 310 generally maintains current index 154 in system memory, at least while tape cartridge 140 is in operational status in tape drive 130 (see FIG. 1B).

When generation control module 315 increments the file system 305 to a new generation, index module 310 writes the contents of current index 154 as a corresponding index in the data partition of the tape. This index then serves to reflect the state of the file system as of the time the index is written. Concurrent with incrementing the file system generation, incremental change module 320 determines what changes have taken place between current index 154 and the previous index saved at the previous generation increment. Incremental change module 320 writes this change information into incremental change dataset 150 (FIG. 1B).

Processing proceeds at operation S260, where index module 310, of LTFS program 300 reads, from index partition 147 of tape medium 146 of tape cartridge 140: (i) the latest index (in this example embodiment, this latest index is herein referred to as the first index, corresponding to the first generation of file system 305); and (ii) incremental change dataset 150. If incremental change dataset 150 does not exist on tape medium 146 (for example, if tape cartridge 140 is new), generation control module 315 sets up the incremental change dataset, in system memory, in conjunction with creation of a next generational increment of file system 305. Information in the latest index is now current index 154. In some embodiments, the first index and current index 154 are maintained as separate and distinct data structures. Whereas current index 154 receives file system updates as they occur, the first index is held as a static snapshot, for later reference (for example with respect to operation S270, discussed below).

In some embodiments of the present invention, while tape cartridge 140 is in operational status, index module 310 and incremental change module 320 (both of LTFS program 300), respectively maintain current index 154, and incremental change dataset 150, in any appropriate memory device(s) available (for example, RAM 230 of memory 208 of tape library server computer 200, FIG. 1A). Any memory device(s) where current index 154 and incremental change dataset 150 are maintained, will herein be referred to as "system memory".

An index describes the mapping between files in the file system, and the data extent(s) on the tape medium where those files are recorded. A current index is integral to the file system, and always maps the current state of the file system. Prior indexes are associated with respectively corresponding previous states (and generations) of the file system. A prior index is analogous to a snapshot of the file system taken at a moment in time when the prior index was current.

Assume here that file system 305 undergoes some changes such as new files being added, existing files being modified, and some files being deleted, etc. Index module 310 makes changes to current index 154 in conjunction with the file system changes. In addition, in some embodiments, incremental change module 320 maintains a copy of the first index in system memory for later reference.

Processing proceeds at operation S265, where generation control module 315 receives a command to increment file system 305 to a new generation (in this example embodiment, a second generation). In response, generation control module 315 writes a copy of current index 154 in data partition 148. In this example embodiment, this copy is herein referred to as the second index, which corresponds to the second generation of file system 305.

Processing proceeds at operation S270, where incremental change module 320, in conjunction with incrementing file system 305 to the second generation, and saving the associated second index (see operation S265 above), compares contents of the first index against contents of the second index, to determine the differences between them. Incremental change module 320 saves the differences in incremental change dataset 150. These differences describe the changes that took place in file system 305 from the creation of the first index, up to the creation of the second index. The differences thus saved in incremental change dataset 150, if applied to current index 154 (and/or to the second index which, at least momentarily, is the same as current index 154), would reconstitute the first index.

For each successive generation of file system 305, LTFS writes a corresponding index in the data partition of the tape. The index corresponds to the current index 154 as it existed at the time the successive generation is created. In other words, when generation control module 315 increments the file system generation, generation control module 315 writes the contents of current index 154 as the corresponding index in the data partition of the tape. Concurrently, incremental change module 320 compares the contents of current index 154 against contents of the previous index (which before the generation increment had been the current index), to determine the differences between them. Incremental change module 320 writes these differences in incremental change dataset 150 (FIG. 1B).

Various events may trigger generation control module 315 to increment the file system to a new generation. Some example triggering events are discussed below in the Further Comments and/or Embodiments sub-section of this Detailed Description section.

Processing proceeds at operation S275, where generation control module 315 receives a command to roll back file system 305 from the second generation to the first generation, meaning current index 154 is to be rolled back to the state it had at creation of the first generation.

Processing proceeds at operation S280, where, in response to receiving the rollback command in operation S275 above, index module 310 reads current index 154 and incremental change dataset 150. Generation control module 315 replaces lines of code in the current index with corresponding lines read from incremental change dataset 150. Thus, current index 154 is rolled back to the state it had when the first generation was created. In other words, the file system has been reset (rolled back) to the first generation.

Alternatively, in some embodiments, in response to receiving the rollback command, index module 310 reads the second index and incremental change dataset 150. Generation control module 315 replaces lines of code in the second index with corresponding lines read from incremental change dataset 150, and installs the modified second index as current index 154. In other words, this is another method by which the file system has been reset (rolled back) to the first generation.

III. Further Comments and/or Embodiments

In some linear tape file systems (LTFSs), an optional element, (for example, <PreviousGenerationLocation>), also called a back pointer, may be specified in an index. By referencing the back pointer, LTFS can navigate to the previously written index. A back pointer, included in an index stored in the index partition, points to the last index written at the end of the data partition (the most recent index). A back pointer included in a given index stored in the data partition points to an index written previous to the given index. With this structure, LTFS can trace back through a succession of back pointers, to locate past generations of the file system. This provides a roll-back function that can restore a given past generation of the file system.

Some embodiments of the present invention may recognize one, or more, of the following facts, potential problems, and/or potential areas for improvement with respect to the current state of the art: (i) as multiple indexes are periodically written on the data partition at short intervals, a very large number of indexes may be written on the data partition until the tape is filled to capacity; (ii) an index includes not only differences (sometimes referred to as "incremental changes") from the previous index but also meta-information pertaining to the whole file system; (iii) the size of each successive newly written index increases over the previous index; (iv) the space used to store these numerous and successively larger indexes takes up a corresponding amount of storage capacity from the data partition that otherwise would be usable for storing data; (v) it may take approximately one to two minutes, on average, to seek and read each previous index on a tape; and/or (vi) it may take a very long time to seek and read a given target generation of the index, all the more so the further back the target generation is from the current generation.

Some embodiments of the present invention provide a method of writing an index for a tape having an index partition and a data partition, comprising the steps of: (i) storing, each time a new index is written in the data partition, the corresponding differences (the incremental changes) between the previous index and the new one; (ii) upon receipt of a request to un-mount a tape, writing, in the index partition, a latest index (the current index) and information including a plurality of incremental changes (sometimes herein referred to as incremental change dataset 150 (see FIG. 1B)), in sequential order; (iii) each time an index to be written in the data partition is updated, storing (in index position/timestamp dataset 152, FIG. 1B) a tape position and timestamp corresponding to the updated index; and/or (iv) upon receipt of a request for unmounting a tape, writing in the index partition, (a) a latest index, (b) the incremental change dataset, and (c) information that associates past indexes with respectively corresponding tape positions and timestamps.

In some embodiments of the present invention, incremental change module 320 of LTFS program 300 (FIG. 3) maintains incremental change dataset 150, associated with tape cartridge 140 (FIG. 1B), in at least one of the devices listed in the following non-exhaustive list: (i) memory 208 of tape library server computer 200, of storage sub-system 102 (FIG. 1A); (ii) tape drive memory 133 of tape drive 130 (FIG. 1B); (iii) cartridge memory 149 of tape cartridge 140 (FIG. 1B); (iv) on tape medium 146 of tape cartridge 140 (FIG. 1B) and/or (v) any memory device that is in data communication with tape library server computer 200 (FIG. 1A). In conjunction with preparations to unmount tape cartridge 140 from tape drive 130, incremental change module 320 writes incremental change dataset 150 on index partition 147 of tape medium 146.

Some embodiments of the present invention may recognize the following potential problems, and/or potential areas for improvement with respect to the current state of the art: In some conventional LTFS systems, it may take approximately one to two minutes, on average, to seek and read an index on a 1,000 meter tape. Some conventional LTFS systems allow for writing up to 15 terabytes (TB) of data on a single tape, and may write an index every five minutes. Consequently, a LTFS system may write several thousand indexes on one tape. Consider a task where it is desired to locate a target index that is the $1000^{th}$ index back from the current one. Assuming it takes one minute to seek each successively older index in turn (by sequentially locating each index, beginning with the current one), to read the back pointer that leads to the next older index, it could take approximately 17 hours to reach the target index (1000 indexes×(1 minute/index)/(60 minutes/hour) 17 hours).

Some embodiments of the present invention, introduce a new index element (incremental change dataset 150) that records information corresponding to incremental changes, from index to successive index, respectively associated with each successive generation. When a current index is to be rolled back to a specified previous target generation, embodiments overwrite the current index, at appropriate places, with the incremental changes, beginning with the most recent increment, and successively working back, in reverse sequential order, to the target generation. In this way, the index corresponding to the target generation will have been restored as the current index, and consequently, the file system will have been rolled back to the target generation. In other words, the current index is brought back to the functional state that it had at the time the target generation was current. Incremental change information recorded at creation of each new generation enables restoration of the previous generation. Incremental change dataset 150 accumulates information from each increment made from generation to generation.

Incremental change dataset 150, in some embodiments, resides in the current index. Alternately, in some embodiments, incremental change dataset 150 resides in host system memory, and/or tape cartridge memory, until such time as the tape is being prepared to be un-mounted from a tape drive in which it is currently mounted (for example tape drive 130 of external devices 214, FIG. 1B). During preparation for un-mounting the tape, incremental change dataset 150 may be written to the index partition and/or to the current index that is written in the data partition of the tape. In some embodiments, incremental change dataset 150 is saved in cartridge memory 149 of tape cartridge 140 (FIG. 1B).

Some embodiments save the incremental change dataset in the index partition. The dataset includes the following elements: (i) <generationnumber> (generation number); (ii) <highestfileuid> (maximum value of file unique identifier (UID) existent in file system 305); and (iii) edited meta-data. In some embodiments, incremental change dataset 150 is a distinct, standalone element. In some embodiments, incremental change dataset 150 is incorporated in a parent file (for example, an index).

Saving of Difference Information

New incremental change dataset 150 comprises the incremental change information associated with advancement of file system 305 from each generation to the next. Some embodiments of the present invention store incremental change dataset 150, for example, in: (i) the current index in the data partition; and/or (ii) in the index partition. The foregoing example are but two of many possible places and manners for storing incremental change dataset 150.

Use of Difference Information

In some embodiments of the present invention, when a file or directory is added to the tape, the incremental change information recorded in the index includes a <highestfileuid> element that had been written in the previous generation of the index. In other words, the <highestfileuid> element from the previous generation is copied into the current index.

In a roll-back operation to restore a previous generation of file system 305, some embodiments of the present invention replace the <highestfileuid> element of the current generation of the index with the saved value of the <highestfileuid> element from the previous generation When extracting meta-data from an index as part of a roll-back operation to restore a file system to a target (previous) generation, some embodiments treat any file or directory information as not existing on the filesystem if the corresponding <fileuid> element has a value greater than the value set in <highestfileuid> element. In this way, the roll-back operation excludes files or directories that had been saved after the target generation had been superseded by one or more newer generations.

When a File is Edited

In some embodiments of the present invention, when a file is edited, the incremental change information includes: (i) a <fileuid> element associated with the edited file; and (ii) <extentinfo> element(s) identifying the extent(s) where the file, prior to the edit, resides on the tape. In a roll-back operation, the current <extentinfo> element associated with the file having the <fileuid> element (item (i) above), is overwritten with the <extentinfo> as recorded in the incremental change information (item (ii) above). An extent contains file data written as sequential logical blocks. A file consists of zero or more data extents plus associated meta-data stored in the index.

When Meta-Information of a File or Directory is Updated

In some embodiments, when meta-information of a file or directory is updated, the incremental change information includes: (i) a <fileuid> element associated with the file or directory; and (ii) the corresponding meta-information as it existed in the previous generation. In an operation to roll back the file system to the previous generation, some embodiments overwrite the current meta-information associated with the file or directory that has the <fileuid> element (item (i) above), with the previous generation meta-information (item (ii) above).

When a File and/or Directory is Deleted

In some embodiments, when a file and/or directory is deleted, the <file> and <directory> elements of the deleted file and/or directory are saved in the incremental change dataset 150. For a file that has been deleted, information of the directory in which the file was present is saved together with the information pertaining to the file. In a roll-back operation, if the same directory exists in the previous generation, some embodiments insert the saved file under the directory information. If the same directory does not exist in the previous generation, some embodiments insert, into the index, the saved directory and file as a whole.

Generally, in some embodiments of the present invention, incremental change module 320 extracts from the extensible markup language (XML) elements of a current index, the minimum amount of information that is necessary to enable rollback to the current generation from a future one, or to enable roll-forward to the current generation from a previous one.

Incremental change module 320 writes the extracted information into incremental change dataset 150 in response to various triggering events, which may include without limitation the following events with respect to tape cartridge 140 mounted in tape drive 130 (see FIG. 1B): (i) a file or directory is added; (ii) a file or directory is deleted; (iii) a file or directory is modified; (iv) meta-data (sometimes herein referred to as meta-information) associated with a file, directory, or any other data structure on tape medium 146, is added, modified, or deleted; (v) at prescribed time intervals (for example, at five-minute intervals); (vi) writing a threshold amount of data to the tape, etc

When a File or Directory is Added

Current index 400A of FIG. 4A shows example extensible markup language (XML) code making up at least a portion of a current index corresponding to generation "3" of file system 305. The XML code in current index 400A represents: (i) a sub-directory named directory1 (404A); and (ii) a file named testfile.txt (406). Sub-directory directory1 (404A) contains a sub-directory named subdir1 (408).

Current index 400B of FIG. 4B shows the XML code of the current index, corresponding to generation "4" of file system 305. In generation "4", fileA.txt (416) has been added to directory1 (404B, prior to an index synchronization operation). Lines of code shown in boldface (FIGS. 4A and 4B) highlight the differences made to the current index as it is updated from generation "3" to generation "4" (400A and 400B). The differences are associated with the addition of fileA. txt (416) to directory1 (404B). In particular: generationnumber is updated from "3" (410A, FIG. 4A) to "4" (410B, FIG. 4B); startblock is updated from "20" (412A, FIG. 4A) to "23" (412B, FIG. 4B); the <file> element (code block 416, FIG. 4B) is added, having a fileuid of "5"; and highestfileuid is updated from "4" (414A, FIG. 4A) to "5" (414B, FIG. 4B) corresponding to the fileuid of fileA.txt, which in this example, happens to have the highest fileuid existing in file system 305.

In response to the addition of fileA.txt, incremental change module 320, of index module 310, of LTFS program 300 (FIG. 3) copies <generationnumber>3</generationnumber> and <highestfileuid>4</highestfileuid> (respectively 410A and 414A, of FIG. 4A) from current index 400A, to incremental change dataset 150 (FIG. 1B). In other words these parameters represent the values of generation number and highest file UID as they existed before fileA.txt was added.

To Perform a Rollback Operation

In some embodiments of the present invention, to roll back file system 305 from a current generation to a previous one, generation control module 315 of LTFS program 300 (FIG. 3) overwrites certain information in the latest index (the current index) with information pertaining to the target generation. In other words, the current index is restored to the functional state it had when it was at the level of the target generation.

In the present example, file system 305 is to be rolled back from generation "4" to generation "3" (a state prior to the addition of fileA.txt). In particular, generation control module 315 overwrites the values associated with the elements <generationnumber> and <highestfileuid> in the current index with the values corresponding to generation "3" (respectively, generation number="3" and highest file UID="4"). The system recalls these values from incremental change dataset 150 (FIG. 1B) where they were saved during the operation to add fileA.txt (discussed above with respect to FIGS. 4A and 4B).

In some embodiments, generation control module 315 ignores files and directories where the corresponding <fileuid> element has a value greater than the value of <highestfileuid> in the current index. Because <highestfileuid> has been restored to "4" (by the operation to restore generation "3" in the current example) and fileA.txt has a fileuid of "5" (line 416, FIG. 4B), which is greater than the now restored <highestfileuid> value of "4", file system 305 ignores fileA.txt. In other words, fileA. txt becomes invisible to file system 305 and file system 305 will have been restored to the state it had at generation "3".

When a File is Deleted

FIG. 4C shows information added to incremental change dataset 150, by incremental change module 320 (FIG. 1B), in response to deletion of testfile.txt (424B, FIG. 4B) from file system 305, in some embodiments of the present invention. Note that testfile.txt is associated with <fileuid>4</fileuid>. In the present example, incremental change module 320 (FIG. 3) copies the following information from the current index 400B to incremental change dataset 150: (i) generation number (410B); and (ii) code representing testfile.txt (424B) along with the parent element identifiers within which the code is nested in data structure of current index 400B, namely 418B, and 426B (see FIGS. 4B and 4C).

A modification operation records, in incremental change dataset 150 (FIG. 1B) only the following information: (i) generation information; and (ii) the meta-information pertaining to a modified part of the index, before the modification to the latest generation index takes place. For example, a file addition operation records only the <highestfileuid> element. And a meta-information modification operation records only the associated <fileuid> element and the previous meta-information. In this way, increases in the size of the index associated with each operation are kept small as compared to conventional methods.

In some embodiments, the aforementioned structure allows for tracing old indexes by using memory operations only, and resorting to tape reads. This enables rolling back to an old generation without having to access the tape. This mechanism is feasible and effective whether or not indexes are written into the data partition.

When a File is Edited

Figure 5A:
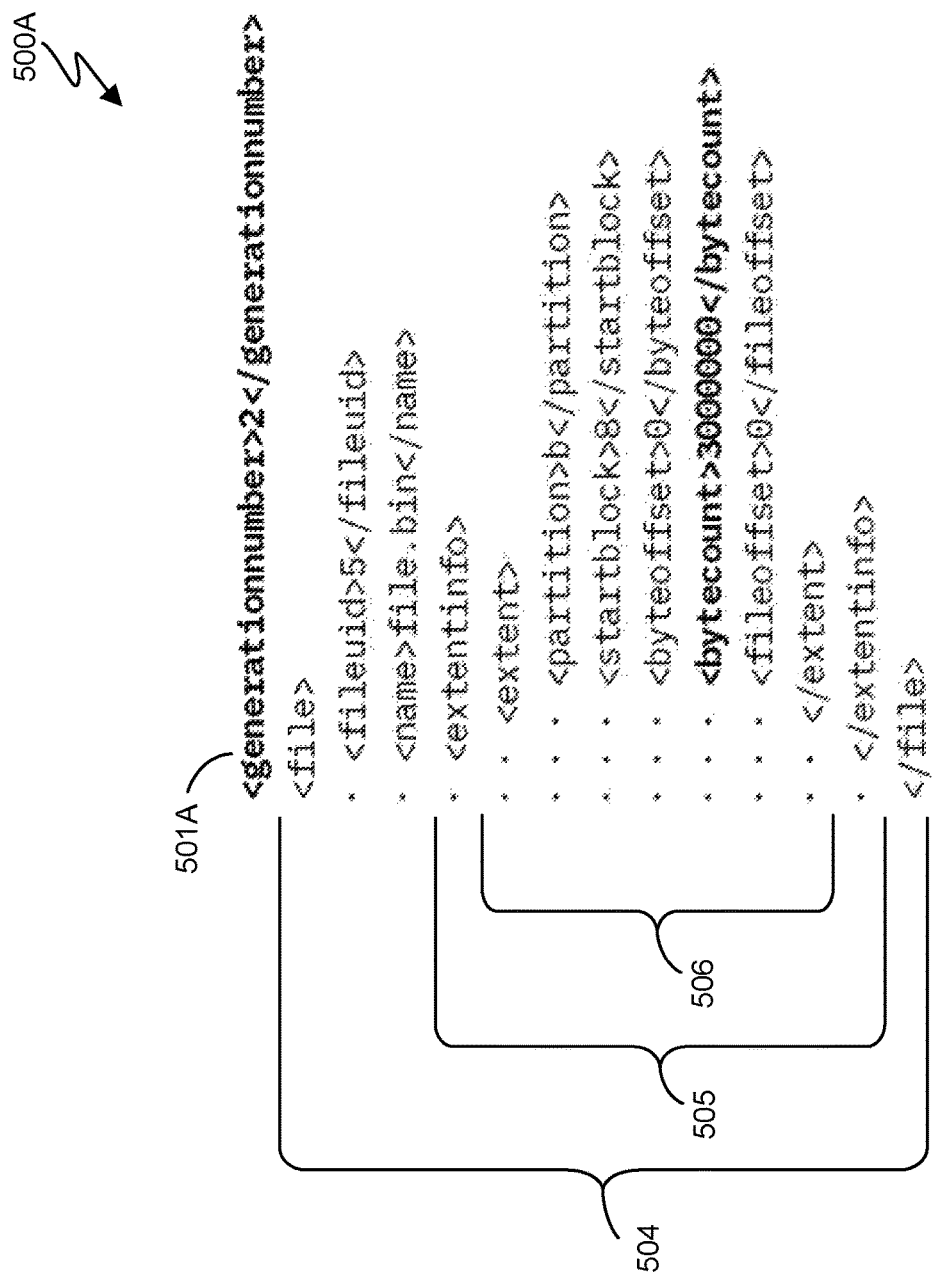
FIG. 5A is a fourth data structure showing information that is generated by embodiments of the present invention.

FIGS. 5A, 5B, and 5C correspond to an example embodiment of the present invention where a file is edited after having been saved to tape. In this example, the file, associated with generation "2" of file system 305, is edited. The edited version is saved to the tape in association with generation "3". Details follow.

In this example embodiment, XML, code excerpt 500A of FIG. 5A is from an index corresponding to the second generation (501A) of file system 305 recorded on the tape. According to excerpt 500A, the file (corresponding to code block 504) has a file unique ID of "5" (<fileuid>5</fileuid>), and is named file.bin, (<name>file.bin</name>). File.bin is stored on the tape according to the particulars coded within a single <extent> (506), in the <extentinfo> (505) block of code, which in turn is embedded within the <file> block of code (504). File.bin is included in partition "b" (<partition>b</partition>), starts at block 8 (<startblock>8</startblock>), has a byteoffset of "0" (<byteoffset>0</byteoffset>), has a size of 3,000,000 bytes (<bytecount>3000000</bytecount>), and has a file offset of 0 (<fileoffset>0</fileoffset>).

In some embodiments, the following definitions apply: (i) index—a data structure which describes the mapping between files and data extents; (ii) partition ID—identifies a partition that contains a given data extent; (iii) start block—a block number within the given data extent where the content for the extent begins; (iv) byte offset (offset to first valid byte)—number of bytes from the beginning of the start block to the beginning of file data for the extent; (v) byte count—number of bytes of file content in the data extent; and (vi) file offset—number of bytes from the beginning of the file to the beginning of the file data recorded in the extent.

XML code excerpt 500B, of FIG. 5B, is from an index corresponding to the third generation (501B) of file system 305 in the present example. File.bin had been edited, and the edited version corresponds to the third generation of file system 305 index. In the third generation, file.bin occupies three extents on the tape, as follows: (i) extent 507 starts at block 8, with 0 bytes offset, is 720,000 bytes in size, and has a file offset of 0; (ii) extent 508 starts at block 18, with 0 bytes offset, is 600,000 bytes in size and has a file offset of 720,000; and (iii) extent 509 starts at block 9, with 271,424 bytes offset, is 9,165,760 bytes in size, and has a file offset of 1,375,000.

Continuing with the present example, XML code excerpt 500C of FIG. 5C shows the incremental change information which is included in the third generation index. The incremental change information includes the file unique ID element (<fileuid>5</fileuid> (510)) and the <extentinfo> element (505C) copied from the index of the previous generation (the second generation index). This information pertains to file.bin, because file.bin is associated with file unique ID 5 as was established above with respect to FIG. 5A.

When an operation to roll file system 305 back to the previous generation (here, to roll back from the third to the second generation), at least with respect to file.bin, the roll-back operation searches for an element having a file unique ID element with a value of 5 (<fileuid>5</fileuid> (510)), and updates the corresponding <extentinfo> information with the information that was stored in the <extentinfo> area of the incremental change information (505C). In this way, file.bin, stored on the tape, as seen by file system 305, has been restored to the state that it had in the second generation.

When Meta-Information of a File or Directory is Updated

In some embodiments, when only meta-information of a file is updated (such as a read-only parameter), and the file data itself is not updated, only the <fileuid> element and the updated meta-information are recorded in the index. The example XML code sequence of FIGS. 6A, 6B, 6C and 6D illustrate a meta-information-only modification of a directory, and a subsequent rollback to a state that file system 305 had before the meta-information had been modified.

Generation "3" current index 608A (FIG. 6A) represents XML code in the current index at the third generation. Generation "4" current index 608B (FIG. 6B) represents XML code in the current index once it has been incremented to the fourth generation. Restored generation "3" current index 608D represents XML code in the current index after it has been rolled back from the fourth to the third generation.

Generation control module 315, of LTFS program 300 (see FIG. 3) increments file system 305 from the third to the fourth generation. In some embodiments, creation of a new generation (here, the fourth generation) is triggered periodically (for example, every five minutes). In other embodiments, a new generation is triggered in response to some file system activity (such as writing a threshold amount of data to the tape and/or a threshold number of new files and/or extents), or by user command, to name just a few examples. Once generation control module 315 has created a new generation, incremental change module 320 determines what differences exist between the previous and current indexes (respectively corresponding to the third and fourth generations in the present example), and writes those differences into incremental change dataset 150 (FIG. 1B). In the present example, those differences are shown in incremental change information 608C (FIG. 6C).

In response to creation of the new generation, incremental change module 320, of index module 310, of LTFS program 300, operating in conjunction with index module 310 (FIG. 3), compares the current index (in the present example, corresponding to the fourth generation) with the previous index (the third generation). Incremental change module 320 determines that the following differences exist between the third and fourth generation indexes: (i) the generation number has been incremented from "3" to "4" (601A and 601B, respectively of FIGS. 6A and 6B); (ii) the code corresponding to directory1 (604A, FIG. 6A, and 604B, FIG. 6B), associated with fileuid 2 (606A) has acquired some extended attributes (602B, FIG. 6B) in the fourth generation. In response to determining these differences, incremental change module 320 writes the incremental change information 608C (FIG. 6C) in incremental change dataset 150 (see FIG. 1B).

In some embodiments, the incremental change information collected from generation to generation, over any number of increments, is collected in serial fashion into incremental change dataset 150, where each new increment is appended onto the accumulated previous information. Incremental change dataset 150 is a running history of file system changes made from generation to generation. In some embodiments of the present invention, incremental change dataset 150 may be stored in various places such as: (i) in a special file saved in index partition 147 of tape medium 146; (ii) in data partition 148 of tape medium 146; (iii) in cartridge memory 149 of tape cartridge 140; (iv) in system memory; and/or (v) in any one of the places already mentioned while the tape cartridge is mounted in a tape drive, and subsequently moved to any other place already mentioned in preparation for un-mounting the tape cartridge from the tape drive. In some embodiments, incremental change dataset 150 is stored in tape library server computer 200 (FIG. 1A, or storage associated therewith, not shown in the Figures), which maintains a mapping of incremental change dataset 150 to tape cartridge 140 (FIG. 1B) for each tape in a tape library system.

In some embodiments, the incremental change dataset is stored in the index partition. In some embodiments, the history of incremental changes is held in system memory until the tape is to be unmounted from a drive, at which time the change history is then written in the index partition, the most recent index in the data partition, and/or in cartridge memory.

In some embodiments of the present invention, a roll-back operation is conducted to restore any generation previous to the current one, by applying the history of incremental changes (as recorded in incremental change dataset 150) in reverse order sequence, beginning with the most recent incremental change, and stepping back through and applying each increment in turn, ending with the increment associated with the target generation.

For example, consider a file system that has gone through six generations and the sixth generation is current. Incremental change dataset 150 (FIG. 1B) holds information corresponding to the first generation to second generation increment, the second to third increment, third to fourth, fourth to fifth, and fifth to sixth generation increments. If a request is made to restore file system 305 to the third generation state, generation control module 315 of LTFS program 300 (see FIG. 3) performs the following steps based on information stored in incremental change dataset 150: (i) updates the current index to generation 5 level, by restoring the parameters recorded in the fifth to sixth increment; (ii) updates the current index again, to generation "4" level, by restoring the parameters recorded in the fourth to fifth increment; and (iii) updates the current index yet again, to generation "3" level, by restoring the parameters recoded in the third to fourth increment.

Alternatively, in some embodiments, generation control module 315 distills all relevant information recorded in incremental change dataset 150, to determine the net change that has occurred between the target generation and the current one (here, between the third and the sixth generations respectively). Then, generation control module 315 applies the net change to the current index, thereby restoring the target generation, by way of a single update to the current index rather than a stepwise series of updates.

Either way (stepwise one generation at a time, or applying a net change in one step), generation control module 315 functionally restores the current index to the target generation level. Files that had been "deleted" subsequent to the third generation are again made visible to file system 305. Files that had been added subsequent to creation of the third generation are hidden from file system 305 and no longer visible to it or accessible by it. And files that had been modified subsequent to creation of the third generation are recognized by file system 305 as they existed at creation of the third generation level (that is, the current index (as restored to the third generation level) references (has pointers to) those extents that made up the files at the third generation level).

In some embodiments, incremental change dataset 150 retains all information added to it since inception. While a roll-back operation can be conducted as described above, based on information included in the incremental change dataset, a roll-forward operation also can be conducted in similar fashion. In a roll-forward operation, a file system that had been rolled back (for instance from a sixth to a third generation as described above), can also be rolled forward as well (for example from the third generation to the fourth, fifth, or sixth generation). This is accomplished by reversing the sequence used to perform a roll-back operation. For example, to restore the sixth generation after file system 305 had been rolled back to the third generation, generation control module 315 extracts information contained in incremental change dataset 150 (FIG. 1B), corresponding to the third to fourth, fourth to fifth, and fifth to sixth generation increments, and applies the information in sequential order (or all at once) to the current index. Once the roll-forward operation is complete, the current index will have been restored, at least functionally, to the sixth generation, and consequently, so too will have been file system 305.

It will be readily recognized by one skilled in the relevant art, that in some embodiments of the present invention "deleting" a file from a tape does not actually remove the file. Instead, the act to delete the file merely updates the index such that file system 305 no longer has visibility to the file and can no longer access it. In other words, the file remains intact on the tape, but file system 305 has no reference pointing to the location(s) or extent(s) on the tape where the file exists. Similarly, "modifying" a file does not actually overwrite the file with updated information. Instead, the "modified" file (or at least "modified" portions thereof) is written anew at an available new location (or locations) and the current index is updated to point to the new location(s) associated with the modified version of the file. The unmodified version of the file remains intact, yet is not addressable by file system 305 (and therefore inaccessible). By rolling back (or forward) the current index to an earlier (or later) target state, file system 305 is rolled back (or forward) accordingly and affected files are restored to a state that corresponds to the target generation.

Continuing with the present example XML code of FIGS. 6A, 6B, 6C and 6D (a meta-information-only modification of a directory and subsequent rollback), FIG. 6B represents the code in the current index after the modification of the directory and the corresponding increment of file system 305 from a third to a fourth generation. Code in boldface (601A of FIG. 6A, 601B and 602B of FIG. 6B) represents lines of code that are updated or added as a result of the incremental change.

Incremental change module 320 determines incremental change information 608C (FIG. 6C) in response to file system 305 being advanced from the third generation to the fourth, and writes the incremental change information in incremental change dataset 150 (FIG. 1B).

In response to a generation change, incremental change module 320, of index module 310, of LTFS program 300 (FIG. 3), compares the current index with the previous index to determine what differences exist between the two, and writes the differences into incremental change dataset 150 (FIG. 1B).

In the present example, incremental change module 320 determines the differences between indexes corresponding to the third and fourth generations, include the following: (i) a record of the previous (the third) generation identifier; and (ii) the state of the extended attributes, that were added in the increment to fourth generation, as they existed at the third generation (before the increment), namely an empty set. These differences are shown as lines 601C and 602C of incremental change information 608C (FIG. 6C). Incremental change module 320 also records line 606C as a unique identifier associated with the extended attributes of line 602C. Incremental change module 320 writes incremental change information 608C into incremental change dataset 150 (FIG. 1B).

FIG. 6D represents code in the current index after the roll-back operation, to restore file system 305 to the third generation, has been performed.

In some embodiments, to perform the rollback operation, generation control module 315 steps through the code in incremental change dataset 150, line by line in sequential order, to roll the current index from generation "4" (608B, FIG. 6B) back to target generation "3" (608D, FIG. 6D). Generation control module 315 performs the roll-back operation by performing the following operations on the current index: (i) reset the generation number; (ii) locate the directory containing the extended attributes that are to be restored; and/or (iii) restore the extended attributes. These operations modify the current index as will be discussed in the following few paragraphs.

(i) Reset the Generation Number

Generation control module 315 replaces the <generationnumber> element in the current index (formerly 601B, FIG. 6B) with the <generationnumber> element (601C, FIG. 6C) copied from incremental change information 608C. Current index 608D now reflects the target generation identifier ("3").

(ii) Locate the Directory Containing the Elements that are to be Restored

In the present example, extended attribute elements are to be restored (current index 602B, FIG. 6B, to be restored to current index 608D, FIG. 6D). Generation control module 315 identifies the correct directory based on the <fileuid> element (606C, FIG. 6C) which uniquely identifies the directory containing the <extendedattributes> that are to be restored. This directory will herein be referred to as the "parent directory". The parent directory is shown as blocks 604A, 604B, and 604D (respectively of FIGS. 6A, 6B, and 6D). The elements <fileuid>2</fileuid> and <name>directory1</name> "belong" to the parent directory.

Element <fileuid> is unique in file system 305 and the corresponding XML of the current index, and is the key identifier of the parent directory. To clarify, in some embodiments, the name "directory1" may exist in any number of places throughout file system 305, and hence can not be treated as a unique identifier. For example, a file or directory named "directory1" might exist under any number of directory trees and/or branches extending therefrom. But only a single instance of the unique file ID (<fileuid>2</fileuid>) is allowed to exist in file system 305. The extended attributes (602B, FIG. 6B), newly added at the fourth generation level, belong to parent directory 604B, FIG. 6B. The parent directory happens to be named "directory1" in this example, but the key identifying element of the parent directory is <fileuid>2</fileuid> (606B, FIG. 6B). Alternatively, in some embodiments, a different identifier (for example: (i) a directory name guaranteed by file system 305 to be unique throughout file system 305; or (ii) any other element that is guaranteed to be unique within file system 305) uniquely identifies the directory associated with a change recorded in incremental change information 608C.

(iii) Restore the Extended Attributes

Generation control module 315 replaces extended attributes (formerly 602B, FIG. 6B) within directory element 604B in the current index (formerly 608B, FIG. 6B), with extended attributes 602C as stored in incremental change information 608C (FIG. 6C). Current index 608D now reflects the functional state of the extended attributes (602D) as they existed at the target generation ("3"). Current index 608D, now rolled back to the third generation is functionally the same as the original current index at the third generation (608A, FIG. 6A), the only difference being the extended attributes (formerly 602B, now 602D). The empty "extended attributes" element in the restored third current index (608D) has the same effect (none) as in the original third generation current index (608A) which had no extended attributes at all.

Some embodiments of the present invention hold the following information items: (i) a list of indexes (for example, timestamp and character strings written by a user) to be presented when a roll-back operation is performed; and (ii) a tape position (record number) of each index recorded on the tape, on the index partition. The format of this information may be freely selected by software or a user. For example, a new element for storing the information items may be defined and stored in the index. Alternatively, the information items may be stored in a file separate and distinct from the index.

With this structure, an LTFS mount operation includes loading, by LTFS program 300, the aforementioned information items into memory (host system memory, or tape drive memory, to name two of many possible examples). Upon receipt of a request to roll the file system back to a target generation, the LTFS program 300 presents a list of indexes present on the tape medium, based on the information items. LTFS program 300, with reference to the list, positions the index corresponding to the target generation at read/write head assembly 132 of tape drive 130 (see FIG. 1B). LTFS program 300 then reads the index into tape drive memory 133 (and/or into system memory) as current index 154. Thus, the file system will have been rolled back to the target generation. This eliminates the need to read the tape to create a list of indexes. In addition, LTFS program 300 can directly seek the position of the index of a desired generation, by moving directly to the corresponding record number, which consequently improves the average access time, in some embodiments, to one to two minutes.

Some embodiments of the present invention may include one, or more, of the following features, characteristics, and/or advantages: (i) as overwriting incremental change information enables a roll-back operation to revert to a past generation, there is no need to write past indexes into the data partition; (ii) shortens the time for a roll-back operation; and (iii) preserves the capacity of the data partition (though in some embodiments, past indexes may be written into the data partition).

Some embodiments of the present invention may include one, or more, of the following features, characteristics, and/or advantages: (i) the data partition holds the past indexes; and (ii) the index partition holds a list of the past indexes that are written in the data partition. Consequently, based on items (i) and (ii) above, some embodiments shorten the time for a roll-back operation as compared to conventional systems.

Some embodiments of the present invention hold only the information that is necessary for reverting to a previous state from the latest state. This significantly reduces the amount of information that generation control module 315 saves in incremental change dataset 150 (FIG. 1B).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:
1. A computer-implemented method, comprising:
  mounting, in a tape drive unit, a tape cartridge comprising a tape storage medium having a file system recorded thereon;

reading, from the tape storage medium: (i) a first index corresponding to a first file system generation present on the tape storage medium, and (ii) an incremental change dataset;

modifying the first index to generate a second index corresponding to a second file system generation present on the tape storage medium;

modifying the incremental change dataset based, at least in part, upon a difference between the first index and the second index;

receiving a first command to roll back the file system generation from the second file system generation to the first file system generation; and in response to receiving the first command, and without utilizing the first index, generating a third index based, at least in part, upon a combination of information in the incremental change dataset and information in the second index, wherein the third index is equivalent, at least in function, to the first index.

2. The method of claim 1, further comprising:

receiving a second command to roll forward the file system generation from the first file system generation to the second file system generation; and in response to receiving the second command, and without utilizing the second index, generating a fourth index based, at least in part, upon a combination of information in the incremental change dataset and information in the third index, wherein the fourth index is equivalent, at least in function, to the second index.

3. The method of claim 1, further comprising:

receiving a second command to un-mount the tape cartridge from the tape drive unit;

in response to receiving the second command, writing, to the tape storage medium, the third index and the incremental change dataset.

4. The method of claim 1, wherein information written on the tape storage medium complies with a linear tape file system (LTFS) standard.

5. The method of claim 1, wherein an index comprises the incremental change dataset.

6. The method of claim 1, wherein the incremental change dataset is saved in cartridge memory.

7. The method of claim 1, wherein the generating of the third index based, at least in part, upon the combination of information in the incremental change dataset and information in the second index occurs using memory operations and without accessing the tape storage medium.

8. The method of claim 1, wherein an amount of time taken to generate the third index based, at least in part, upon the combination of information in the incremental change dataset and information in the second index is less than an amount of time it would take to locate the first index on the tape storage medium.

9. A computer program product comprising a computer readable storage medium having stored thereon program instructions programmed to perform:

mounting, in a tape drive unit, a tape cartridge comprising a tape storage medium having a file system recorded thereon;

reading, from the tape storage medium: (i) a first index corresponding to a first file system generation present on the tape storage medium, and (ii) an incremental change dataset;

modifying the first index to generate a second index corresponding to a second file system generation present on the tape storage medium;

modifying the incremental change dataset based, at least in part, upon a difference between the first index and the second index;

receiving a first command to roll back the file system generation from the second file system generation to the first file system generation; and in response to receiving the first command, and without utilizing the first index, generating a third index based, at least in part, upon a combination of information in the incremental change dataset and information in the second index, wherein the third index is equivalent, at least in function, to the first index.

10. The computer program product of claim 9, further comprising program instructions programmed to perform:

receiving a second command to roll forward the file system generation from the first file system generation to the second file system generation; and in response to receiving the second command, and without utilizing the second index, generating a fourth index based, at least in part, upon a combination of information in the incremental change dataset and information in the third index, wherein the fourth index is equivalent, at least in function, to the second index.

11. The computer program product of claim 9, further comprising program instructions programmed to perform:

receiving a second command to un-mount the tape cartridge from the tape drive unit;

in response to receiving the second command, writing, to the tape storage medium, the third index and the incremental change dataset.

12. The computer program product of claim 9, wherein information written on the tape storage medium complies with a linear tape file system (LTFS) standard.

13. The computer program product of claim 9, wherein an index comprises the incremental change dataset.

14. The computer program product of claim 9, wherein the incremental change dataset is saved in cartridge memory.

15. A computer system comprising:

a processor set; and a computer readable storage medium;

wherein:

the processor set is structured, located, connected and/or programmed to run program instructions stored on the computer readable storage medium; and the program instructions include instructions programmed to perform:

mounting, in a tape drive unit, a tape cartridge comprising a tape storage medium having a file system recorded thereon;

reading, from the tape storage medium: (i) a first index corresponding to a first file system generation present on the tape storage medium, and (ii) an incremental change dataset;

modifying the first index to generate a second index corresponding to a second file system generation present on the tape storage medium;

modifying the incremental change dataset based, at least in part, upon a difference between the first index and the second index;

receiving a first command to roll back the file system generation from the second file system generation to the first file system generation; and in response to receiving the first command, and without utilizing the first index, generating a third index based, at least in part, upon a combination of information in the incremental change dataset and information in the second index, wherein the third index is equivalent, at least in function, to the first index.

16. The computer system of claim 15, further comprising program instructions programmed to perform:
   receiving a second command to roll forward the file system generation from the first file system generation to the second file system generation; and
   in response to receiving the second command, and without utilizing the second index, generating a fourth index based, at least in part, upon a combination of information in the incremental change dataset and information in the third index, wherein the fourth index is equivalent, at least in function, to the second index.

17. The computer system of claim 15, further comprising program instructions programmed to perform:
   receiving a second command to un-mount the tape cartridge from the tape drive unit;
   in response to receiving the second command, writing, to the tape storage medium, the third index and the incremental change dataset.

18. The computer system of claim 15, wherein information written on the tape storage medium complies with a linear tape file system (LTFS) standard.

19. The computer system of claim 15, wherein an index comprises the incremental change dataset.

20. The computer system of claim 15, wherein the incremental change dataset is saved in cartridge memory.

\* \* \* \* \*